United States Patent [19]

Olejak

[11] Patent Number: 4,981,011
[45] Date of Patent: Jan. 1, 1991

[54] LAWNMOWER CUTOFF SYSTEM

[76] Inventor: Ingo Olejak, 6815 Farnaby Ct., Spring, Tex. 77379

[21] Appl. No.: 360,453

[22] Filed: Jun. 2, 1989

[51] Int. Cl.$^5$ .................. A01D 34/48; A01D 34/70
[52] U.S. Cl. ......................... 56/10.2; 56/DIG. 15; 56/DIG. 2
[58] Field of Search ............... 56/10.2, 10.5, DIG. 15, 56/DIG. 2, 194, 202; 460/1, 6

[56] References Cited

U.S. PATENT DOCUMENTS

| | | | |
|---|---|---|---|
| 3,169,358 | 2/1965 | Ertsgaard et al. | 56/10.5 |
| 3,969,875 | 7/1976 | Nofel | 56/10.5 X |
| 4,345,418 | 8/1982 | Arizpe | 56/10.5 X |
| 4,466,504 | 8/1984 | Giandenoto et al. | 56/10.5 X |
| 4,490,965 | 1/1985 | Hutchison | 56/10.2 X |

Primary Examiner—Stephen J. Novosad
Attorney, Agent, or Firm—Alan R. Thiele

[57] ABSTRACT

A lawnmower engine cutoff system interrupts the electrical flow to the ignition system of an engine when a predetermined weight of clippings is contained within the catch bag for grass clippings. Mechanical movement is generated by the weight of the grass clippings contained in the catch bag. This movement is then sent to a switch in the ignition system of the engine. When the movement reaches a predetermined level, the switch in the electrical system of the engine is opened and the engine ceases operation.

21 Claims, 3 Drawing Sheets

LAWNMOWER CUTOFF SYSTEM

BACKGROUND OF THE INVENTION

The present invention relates to lawnmowers; more particularly, the present invention relates to cutoff systems for lawnmowers.

Many homeowners and small businessmen utilize lawnmowers on a frequent basis to cut the grass surrounding residences. These lawnmowers often include bags or containers to catch grass clippings once they have been cut from the growing grass. As the bag or container for the clippings becomes heavier, it becomes more difficult to maneuver the lawnmower. Similarly, as the bag or container for the clippings becomes full, the clippings in the bottom of the bag may be recirculated through the turning cutting blade and back onto the growing grass. Users must then estimate the occurrence of changes in mower operating characteristics to determine when it is time to empty the clipping collection container.

Mower clogging problems also manifest themselves when the grass clippings are wet. These problems usually occur after a period of rain and a portion of the lawn is still damp. Operation of a lawnmower with an inordinate amount of wet clippings in the clipping collection container may affect the weight distribution of the lawnmower on its wheels and cause an uneven cut and the excess weight may damage the grass collection container.

Riding lawnmowers exhibit similar problems. In many riding lawnmowers, a small window is provided which purportedly allows the user to check on the level of clippings in the collection containers. Visibility through these windows is quickly obscured by the dust normally associated with a mowing operation. Accordingly, it is impossible to determine when the collection containers are full. Users must then estimate when it is time to empty the clipping collection containers.

The prior art has addressed numerous systems for providing safety interlocks for lawnmowers; however, none of these systems has addressed the need for providing a cutoff system for the lawnmower in response to the weight of the grass clippings in the clippings catch bag or clipping collection container.

There is, therefore, a need in the art to provide a system which cuts off the engine in a lawnmower in response to the weight of the clippings contained in the clippings catch bag or clipping collection container.

SUMMARY OF THE INVENTION

The cutoff system of the present invention operates in response to the weight of the clippings contained in the grass collection container. The present cutoff system is designed for use with a lawnmower having an engine which depends on electrical power for operation. Exemplary of such engines are internal combustion engines which have an electrical ignition system. Such lawnmowers should also utilize a bag or container for collecting grass clippings. These mowers may be of the self-propelled, riding or manual push type. The cutoff system disclosed herein activates a switch contained in the electrical ignition system of the engine. When the switch is in an open condition, the engine will not run. If the engine is running and the switch is caused to open, the engine will cease operation.

The weight of the clippings is transmitted to the switch mechanism by a spring-biased mechanical arm which is attached to the bag or container for collecting grass clippings. The mechanical arm moves and overcomes the spring bias in response to the weight of the clippings in the collection bag or container. When the weight of the clippings in the collection bag reaches a predetermined level and the spring bias is completely overcome, the movement of the arm causes the switch in the electrical ignition system of the engine to open, thus cutting off power to the mower. Because movement of the collection bag or container is essential to the operation of the present system, provision is made in the mounting of the collection bag or container system for such movement.

To prevent false signals from cutting off the mower, a time delay device may be included in the switch circuitry. This time delay device will prevent false signals generated by the bouncing of the lawnmower activating the cutoff switch. If desired, the time delay device may be adjustable to accommodate various types of terrain. The predetermined level of the weight of the clippings in the collection bag or container may be controlled by the use of either tension, compression or torsion springs or by selecting an electrical force transducer having predetermined levels for signal generation.

BRIEF DESCRIPTION OF THE DRAWINGS

A better understanding of the lawnmower cutoff system of the present invention may be had by reference to the figures wherein.

DESCRIPTION OF THE EMBODIMENTS

Figure 1:
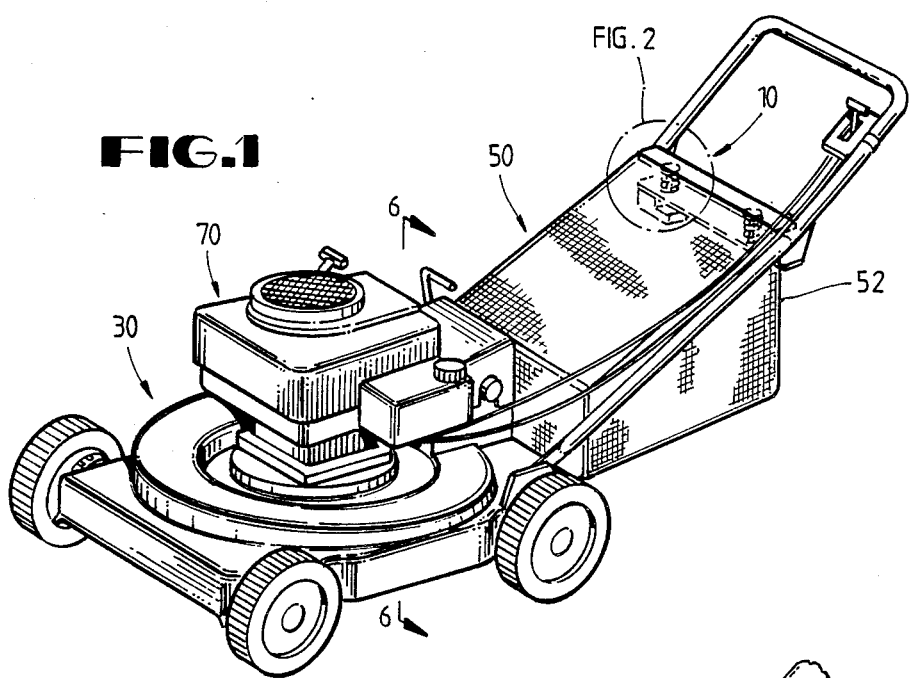
FIG. 1 is a perspective view of a rear discharge, rotary style lawnmower including the preferred embodiment of the cutoff system of the present invention.
Figure 2:
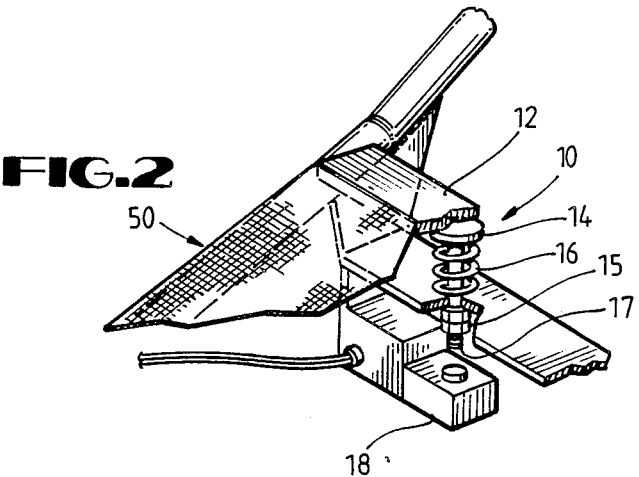
FIG. 2 is a detailed view according to the designated portion of FIG. 1.
Figure 3:
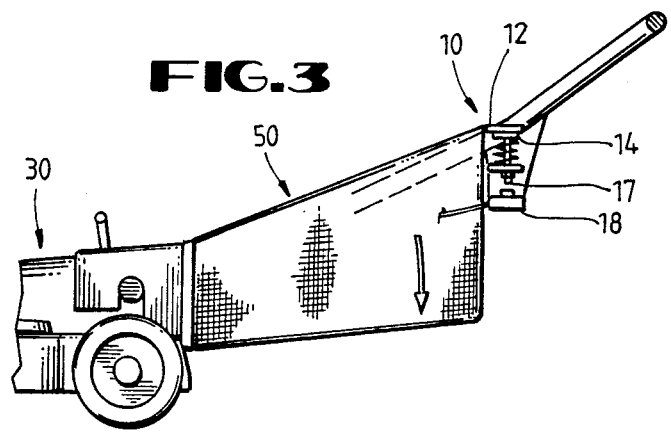
FIG. 3 is a side elevational view of the lawnmower shown in FIG. 1.

A better understanding of the lawnmower cutoff system of the present invention may be had by reference to the preferred embodiment 10 illustrated in FIGS. 1, 2 and 3. Therein, it may be seen that the system 10 is used with a conventional lawnmower 30. For purposes of illustration, a rear discharge mower is shown. As will be explained below, the system may be used with other style mowers. Such lawnmowers 30 may be of the rotary type illustrated or conceivably the invention 10 may also be used with the now less conventional reel type lawnmowers (not shown). Additionally, the system may be used with riding lawn mowers. The common factor between all these lawnmowers is that the lawnmower 30 includes a catch bag or container 50 for catching grass clippings. The mounting of the catch bag or container 50 for grass clippings provides the place on the lawnmower for placement of the cutoff system 10 of the present invention.

Attached to the outboard end 52 of catch bag 50 is an arm member 12. Underneath arm member 12 is located a plunger member 14. While one plunger member 14 may be adequate to operate the invention, shown in the preferred embodiment of FIG. 1 are a plurality of plunger members 14. Plunger members 14 are biased upward into a position over switch 18 by spring 16. The travel of plunger member 14 is limited by the pair of stop nuts 15. Because the travel of plunger member 14 is directly related to the weight of the clippings in catch bag or container 50, the adjustment of the travel of plunger member 14 by adjusting stop nuts 15 thus allows the user to select the amount of weight in container 50 which will cause lawnmower 30 to shut off.

When arm 12 moves downward by the weight of grass clippings in container 50, it contacts plunger member 14 which compresses spring 16. As spring 16 compresses, the bottom 17 of plunger member 14 contacts electrical switch 18. As electrical switch 18 is contacted by the bottom 17 of plunger member 14, it opens the circuit to the electrical ignition system of engine 70. When switch 18 is opened, engine 70 cuts off.

In the alternate embodiments shown, the same general numbering scheme is employed except that a digit is placed in the hundreds place to distinguish among the various alternate embodiments.

Figure 4:
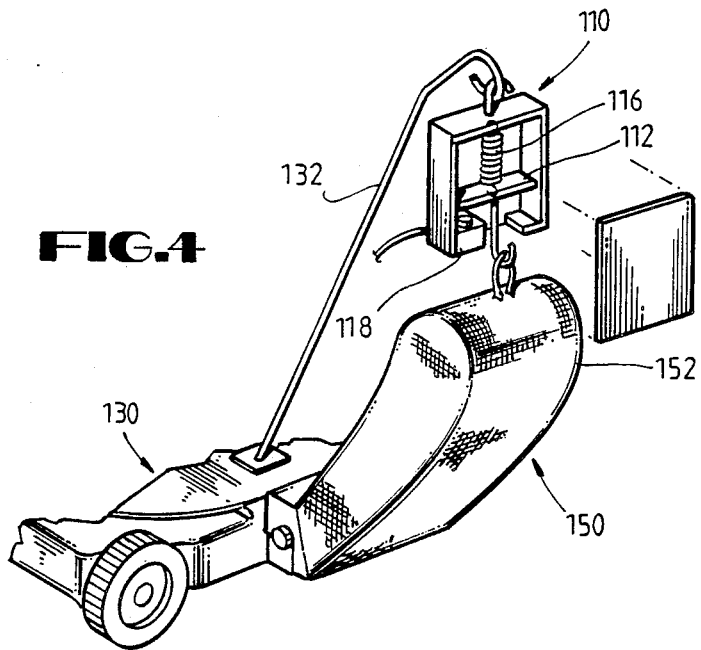
FIG. 4 is a first alternate embodiment of the cutoff system of the present invention shown with a side discharge mower.

As shown in FIG. 4, the cutoff system of the present invention 110 may also be used with lawnmowers 130 having side eject pathways for grass clippings. Such lawnmowers normally include a brace 132 which holds up the outboard end 152 of the grass clipping bag 150. In such case, arm member 112 may be supported by a spring 116. As the clippings fill catch bag 150, spring 116 is caused to extend. The tension placed on spring 116 biases arm 112 into an upper position. The weight of the grass clippings in container 150 then draws arm 112 down to a position where it may mechanically contact the electrical switch 118. Switch 118 is electrically coupled to the engine ignition system.

Figure 5:
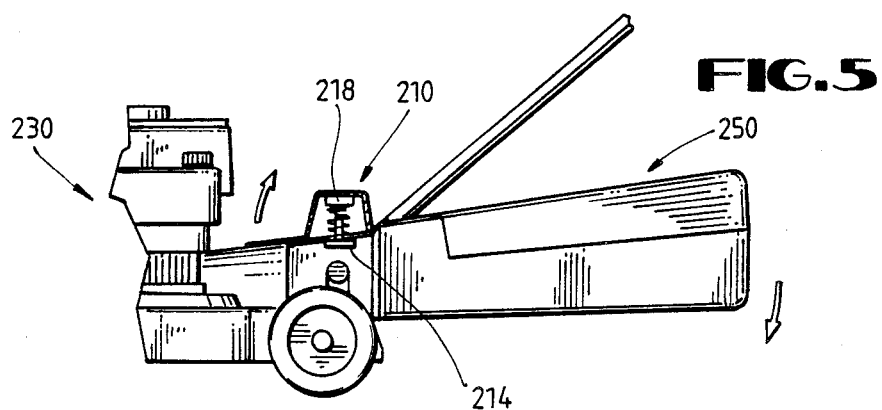
FIG. 5 is a second alternate embodiment of the cutoff system of the present invention shown with a containerized rear discharge mower.

As shown in FIG. 5, the cutoff system of the present invention 210 may also be used with a lawnmower 230 having the rigid type of grass collection system 250. Therein, the weight of the grass clippings will cause an upward movement of plunger 214 in order to mechanically contact switch 218 to cutoff the engine ignition system.

Figure 6:
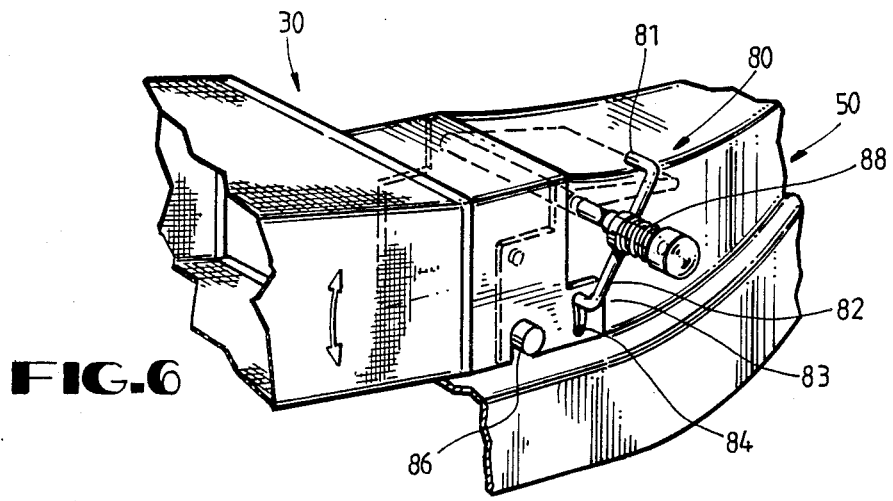
FIG. 6 is an enlarged perspective view at line 6—6 of FIG. 1.

Because movement of the clipping collection container is essential for operation of the existing system, a mounting system accommodating such movement must be provided. Exemplary of such mounting systems is the apparatus shown in FIG. 6. Therein mounting system 80 is shown. Such system includes a substantially u-shaped bracket 82 which assures a positive connection between container 50 and mower 30. The top end 81 of bracket 82 contacts container 50 and the bottom end 83 contacts slot 84. Accordingly, as the weight of container 50 increases, it will rotate about pivot 86. Connection between container 50 and mower 30 is maintained by the sliding of bottom end 83 down through slot 84. Spring bias 88 holds bracket 82 in position. While such pivotal movement is shown in association with the preferred embodiment, those of ordinary skill in the art will understand that pivotal movement mechanisms as the one shown with the preferred embodiment may be used with the other embodiments.

Figure 8:
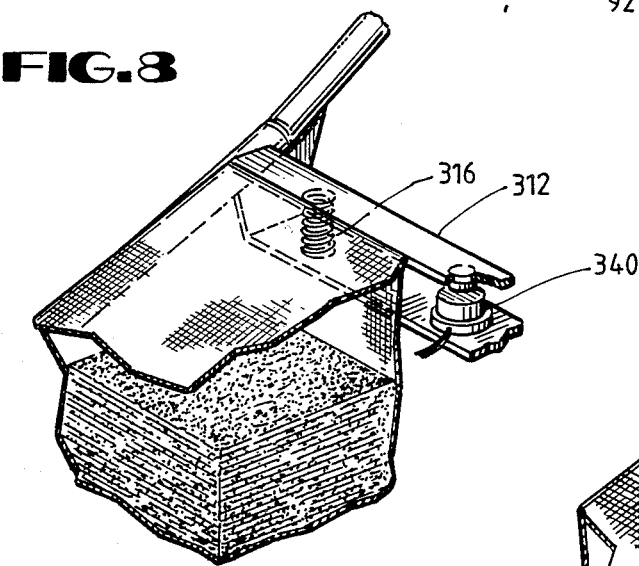
FIG. 8 is a third alternate embodiment of the cutoff system of the present invention shown with a rear discharge mower.

In FIG. 8 a force transducer 340 is used to sense mechanical movement of arm 312. The use of a force transducer 340 eliminates the need for a spring and plunger member assembly; however, a spring 316 may be used if desired.

Figure 9:
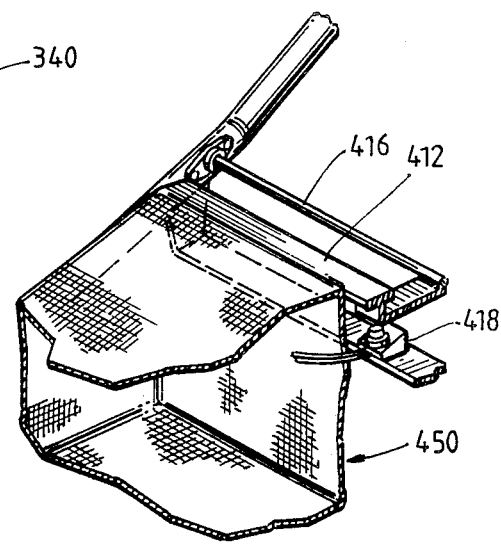
FIG. 9 is a fourth alternate embodiment of the cutoff system of the present invention shown with a rear discharge mower.

It may also be seen by reference to FIG. 9 that a torsion spring 416 may be used. Torsion spring 416 serves the same function as the spring in FIG. 1. The weight of the grass clippings in container 450 will cause a twisting moment on torsion spring 416, thus delaying the contact of arm member 412 with the electrical switch 418 to cutoff electrical power to the ignition system of the lawnmower engine.

Figure 10:
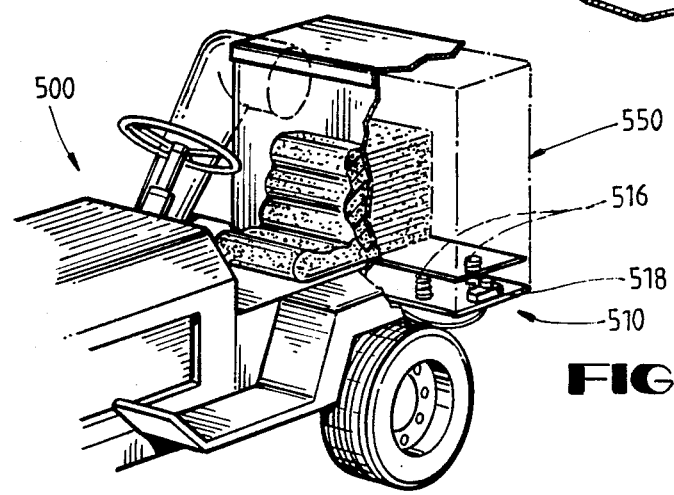
FIG. 10 is an illustration of a typical installation of the lawnmower cutoff system on a riding mower.

In FIG. 10 cutoff system 510 is used with a riding lawnmower 500. Switch 518 is placed under container 550 so that the weight of the clippings in container 550 will move container 550 into contact with switch 518 and thus cut off electrical power to the engine. Springs 516 bias container 518 upwardly so that the engine power is not cut off until container 518 is approximately full.

Figure 7:
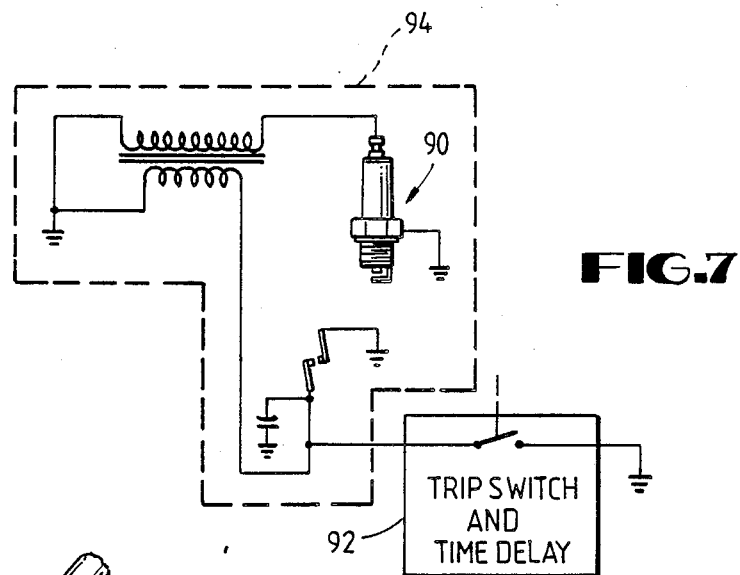
FIG. 7 is a circuit diagram illustrating the circuitry required for activation of the cutoff system.

Illustrated in FIG. 7 is electrical circuit 90. Circuit 90 indicates one method of transmitting the signal generated by the weight of the clippings in the collection bag to the ignition system 94 of the engine. It will be noted that a time delay device 92 has been placed in circuit 90. Time delay device 92 prevents the generation of false signals caused by the bouncing of the lawnmower on rough terrain.

OPERATION

The operation of the cutoff system of the present invention will be explained with reference to the preferred embodiment. It will be understood that the operation of the alternate embodiments may be easily understood by reference to the operation of the preferred embodiment.

The cutoff system of the present invention 10 operates by sensing the weight of the cut clippings in collection bag 50 of lawnmower 30. As the amount of clippings accumulates in the collection bag 50 of lawnmower 30, the weight of the clippings contained in collection bag increases. This weight is used to generate mechanical movement which activates a switch which interrupts the electrical ignition circuit 90 (FIG. 7). The mechanical movement is dampened by the use of a compression spring 16 (FIG. 2), a tension spring 116 (FIG. 4), a torsion spring 416 (FIG. 9). In an alternate embodiment, a force transducer 340 (FIG. 8) may be used in place of a mechanical spring.

There is thereby provided by the cutoff system of the present invention a method for cutting off the engine of a lawnmower in response to the weight of the clippings contained in a catch bag or container.

While the invention has been described with reference to the foregoing embodiments, it will be understood that the scope of the invention is to be limited only by the appended claims.

I claim:

1. A cutoff system for a lawnmower powered by an engine with an electrical ignition system and having a collection bag or container for grass clippings, said cutoff system comprising in operative combination:

a switch constructed and arranged to interrupt electrical flow in the ignition system;
means generating mechanical movement in response to the weight of the collection bag or container;
means for causing said mechanical movement to change the condition of said switch when said mechanical movement reaches a predetermined level.

2. The system as defined in claim 1 further including means for accommodating a pivotal movement of the collection bag or container for grass clippings.

3. The system as defined in claim 1 further including a time delay mechanism electrically coupled to said switch means.

4. The system as defined in claim 1 wherein said mechanical movement is made by an arm member.

5. The system as defined in claim 4 wherein said arm member is spring biased.

6. The system as defined in claim 5 wherein physical contact of said arm member with said switch changes the condition of said switch.

7. The system as defined in claim 5 wherein said spring bias is provided by a tension spring.

8. The system as defined in claim 5 wherein said spring bias is provided by a compression spring.

9. The system as defined in claim 5 wherein said spring bias is provided by a torsion spring.

10. The system as defined in claim 1 wherein said switch is a force transducer.

11. A lawnmower comprising:
means for cutting grass and generating grass clippings;
an engine having an electrical ignition system mechanically coupled to said means for cutting grass;
bag means for collecting said grass clippings;
an engine cutoff system including:
a switch constructed and arranged to interrupt electrical flow in said ignition system;
means for generating mechanical movement in response to the weight of the collection bag or container;
means for causing said mechanical movement to change the condition of said switch when said mechanical movement reaches a predetermined level.

12. The system as defined in claim 11 further including means for accommodating a pivotal movement of the collection bag or container for grass clippings.

13. The system as defined in claim 11 further including a time delay mechanism electrically coupled to said switch means.

14. The system as defined in claim 11 wherein said mechanical movement is made by an arm member.

15. The system as defined in claim 14 wherein said arm member is spring biased.

16. The system as defined in claim 15 wherein physical contact of said arm member with said switch changes the condition of said switch.

17. The system as defined in claim 15 wherein said spring bias is provided by a tension spring.

18. The system as defined in claim 15 wherein said spring bias is provided by a compression spring.

19. The system as defined in claim 15 wherein said spring bias is provided by a torsion spring.

20. The system as defined in claim 11 wherein said switch is a force transducer.

21. A method for cutting off the engine of a lawnmower having an electrical ignition system and a bag for collecting grass clippings, said method comprising the steps of:
generating mechanical movement in response to the weight of the grass clippings contained in the collection bag;
using said mechanical movement to change the condition of a switch to interrupt the flow of electricity in the electrical ignition system of the lawnmower engine.

* * * * *